No. 666,081. Patented Jan. 15, 1901.
W. H. WILLIAMS.
PROPELLING AND STEERING MECHANISM FOR VEHICLES.
(Application filed Mar. 3, 1900.)
(No Model.)
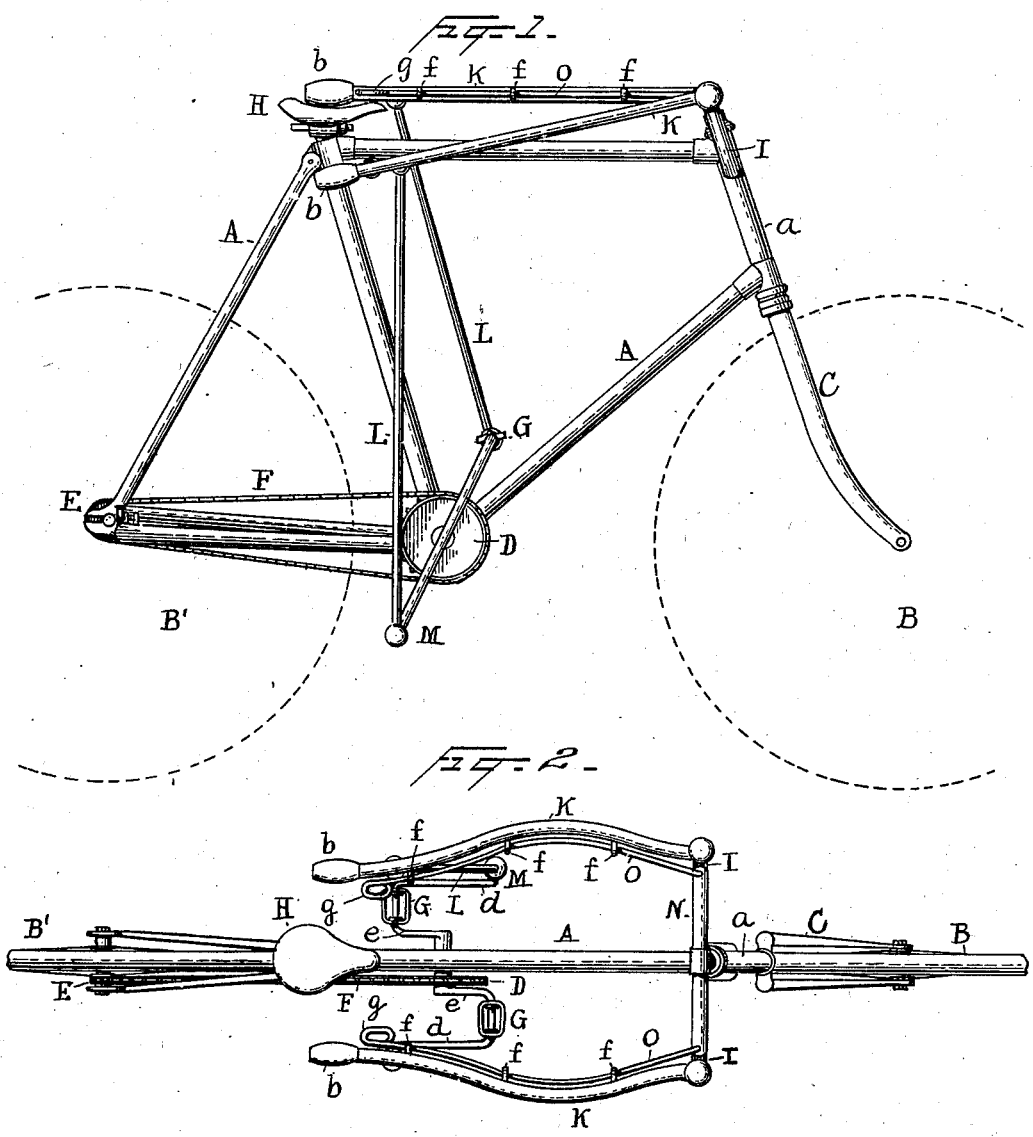
WITNESSES:
Norris A. Clark
Chas E. Peters
INVENTOR
William H. Williams
BY
ATTORNEY

United States Patent Office.

WILLIAM H. WILLIAMS, OF JERICHO, NEW YORK.

PROPELLING AND STEERING MECHANISM FOR VEHICLES.

SPECIFICATION forming part of Letters Patent No. 666,081, dated January 15, 1901.

Application filed March 3, 1900. Serial No. 7,170. (No model.)

*To all whom it may concern:*

Be it known that I, WILLIAM H. WILLIAMS, a citizen of the United States, residing at Jericho, in the county of Nassau and State of New York, have invented certain new and useful Improvements in Propelling and Steering Mechanism for Vehicles; and I do hereby declare the following to be a full, clear, and exact description of the invention, such as will enable others skilled in the art to which it appertains to make and use the same.

My invention relates to improvements in the driving or propelling mechanism of vehicles, more especially bicycles, tricycles, and other vehicles propelled or driven by the rider.

The object of my improvements is twofold: first, in easy wheeling, to utilize the sway of the body, reduce the exertion that falls upon the legs, making riding less fatiguing, give the hands and arms a portion of the work, save them from the benumbing effect of holding rigid hand-bars, and relieve the body of the one-sided strain of riding and propelling in the usual way, and, second, in heavy grades, soft roads, races, or any other case where the maximum of power is desired, to bring into service the full strength of all the limbs and the entire weight of the operator or rider.

The invention consists in hand-levers pivoted at one end to a cross-bar mounted in brackets connected with the head of the frame extending back to a position convenient to be grasped by the hands of the rider without materially changing his upright position in the seat and connected by vertical rods with cranks formed on extensions of the pedal-cranks, the construction and arrangement being such that when the pedal is depressed on one side by the foot the weight of the upper part of the body is simultaneously thrown by means of the lever on the crank on the same side. The other side pedal being raised, the hand on that side may lift on its lever, which lifting power is exerted twice, first in lifting on the lever, and, second, by adding just so much more to the pressure of the foot on the descending pedal, thus aiding the foot in turning the sprocket-wheel and driving the vehicle.

The invention further consists in a steering device arranged so that it can be manipulated by the hands grasping the levers without removal therefrom.

The accompanying drawings show my improved propelling and steering mechanism as applied to a diamond-frame bicycle.

Figure 1 represents a side elevation of a bicycle provided with my improved propelling and steering mechanism, the wheels of the bicycle being shown in dotted lines only; and Fig. 2, a plan of the same.

Referring to the drawings, A indicates the frame of the bicycle, which is of the well-known "diamond" form and construction; B B', the front and hind wheels; C, the fork the head of which is passed through and turns in the front member *a* of the frame in the usual manner; D, the sprocket driving-wheel; E, the sprocket-pinion on the axle of the hind wheel; F, the drive-chain; G G, the pedals, and H the seat, all of these parts being constructed substantially as in the standard "safety-wheels" of the present day.

On opposite sides of the front member *a* of the frame are brackets I I, which are curved upward and outward, so that their ends are just above the top of the fork-head. K K represent hand-levers the front ends of which are pivoted or fulcrumed horizontally in the upper ends of the said brackets, so that a vertical vibrating motion can be given to them. The said hand-levers are curved outward or laterally for a portion of their length and then inward again, and they extend backward toward the seat of the bicycle and terminate with hand-grips *b b*. The purpose of curving the hand-levers is to give space between them and the frame of the machine and the pedals to work the knees up and down in pedaling and also to afford space between the grips of the said levers and the hips of the rider, so that the levers can be vibrated up and down without coming in contact with the body. The exact amount of curvature to be given the levers cannot be determined in advance for all cases, and they must be formed to suit the different classes of riders.

L L are connecting-rods the upper ends of which are pivoted to the hand-levers underneath, as shown, or to one or the other sides thereof, as experience may show to be best, and at such a distance from a vertical line drawn through the crank-axle as may be required and as experience may determine to be best for the easy operation of the cranks. The lower ends of these connecting-rods are connected with the cranks M M, which are formed on arms or extensions *d d* of the pedals G G. The extensions are shown to be parallel with the arms *e e* of the cranks, but turned in the opposite direction; but they may be set at an angle to the said arms, if desired. The steering mechanism consists of a cross-bar N, fastened rigidly to the top of the fork-head and of such a length that its ends can move freely between the pivoted connections of the hand-levers in the brackets.

O O are metallic rods connected with the cross-bar N by universal joints (said joints may be fastened to ordinary handle-bars curved upward) and carried through loops *f* on the hand-levers back and nearly parallel with the said levers to a point near the hand-grips *b b*, where they terminate with thumb loops or hooks *g g* in such a position that when the hands of the rider grasp the grips the thumbs can be inserted in the said loops for the purpose of moving the said rods back and forth for the purpose of steering. As shown, the steering-rods extend along the inside of the hand-levers; but they may be placed underneath said levers, if desired.

By means of the hand-levers the upper part of the body and hands can be applied to augment the propelling force applied to the cranks instead of being used wholly for balancing and steering. By grasping the levers the rider will have as perfect control of the bicycle as with the handle-bars, and the weight of the upper part of the body and the muscular force exerted by the arms are both utilized in driving the bicycle.

It is evident that my improvements are applicable without material change to tricycles, quadricycles, &c., and their advantages are equally useful in connection with those vehicles as with bicycles. It is also evident that my improvements are applicable to running hand machinery, such as saws, lathes, propellers, hand-cars, &c. It is also evident that my improvements are also applicable to other mechanisms than chain-gear—such, for example, as spur or tooth gearing for transmitting the motion of the cranks to the driving-wheel of a vehicle.

I claim—

1. In a vehicle the combination with the driving mechanism of two hand-levers fulcrumed to fixed bearings on each side of the front frame, connecting-rods pivoted to each of the hand-levers, double cranks mounted on each end of the crank-shaft—the inner cranks having the usual pedals and the outer cranks returned and extended past the crank-shaft and pivoted to the lower end of the connecting-rod on the same side, the pedal and connecting-rod cranks on one side being respectively oppositely placed to those on the other side, substantially as specified.

2. In a vehicle the combination with the driving mechanism of two hand-levers fulcrumed to the frame on each side and provided with grips, connecting-rods pivoted to each hand-lever, double cranks mounted on each end of the crank-shaft—the inner one of each double crank carrying a pedal and the outer one extended beyond the crank-shaft and pivoted to the lower end of the connecting-rod on the same side, the pedal and connecting-rod crank on one side being respectively oppositely placed to those on the other side, and steering mechanism consisting of a bar fixed to the fork-head, and rods connected with the ends of said bar carried back to the grips of the hand-levers and provided with loops for the thumbs to adapt the steering to be done without removing the hands from the grips, substantially as specified.

3. In vehicles the combination with the hand-levers provided with grips and the fork-head of a bar fixed thereto, rods pivoted to the ends of said bar and extended along the hand-levers and provided with loops to receive the thumbs while the hands grasp the grips, substantially as specified.

In testimony that I claim the invention above set forth I affix my signature in presence of two witnesses.

WILLIAM H. WILLIAMS.

Witnesses:
ADAM WIENER,
CHAS. E. PETERS.